(12) United States Patent
Ben-Yaacov et al.

(10) Patent No.: US 11,644,886 B1
(45) Date of Patent: May 9, 2023

(54) DUAL POWER UNITS BASED POWER DISTRIBUTION SYSTEM

(71) Applicant: IRP Nexus Group, Ltd., Ness Ziona (IL)

(72) Inventors: Shmuel Ben-Yaacov, Tel Itzhak (IL); Paul Abraham Price, Ness Ziona (IL); Oded Arlevski, Shdema (IL)

(73) Assignee: IRP Nexus Group, Ltd., Ness Ziona (IL)

( * ) Notice: Subject to any disclaimer, the term of this patent is extended or adjusted under 35 U.S.C. 154(b) by 0 days.

(21) Appl. No.: 17/746,643

(22) Filed: May 17, 2022

(51) Int. Cl.
*G06F 1/32* (2019.01)
*G06F 1/3234* (2019.01)
*G06F 1/3296* (2019.01)

(52) U.S. Cl.
CPC .......... *G06F 1/3253* (2013.01); *G06F 1/3296* (2013.01)

(58) Field of Classification Search
CPC .............................. G06F 1/3253; G06F 1/3296
USPC ....................................................... 713/320
See application file for complete search history.

(56) References Cited

U.S. PATENT DOCUMENTS

| | | | |
|---|---|---|---|
| 4,463,400 A | 7/1984 | Paice et al. | |
| 8,896,251 B2 | 11/2014 | Le et al. | |
| 9,425,631 B2 * | 8/2016 | Furtner | H02J 7/0018 |
| 10,673,244 B2 | 6/2020 | Arditi et al. | |
| 11,370,308 B1 * | 6/2022 | Ben-Yaakov | B60L 50/60 |
| 2003/0132732 A1 * | 7/2003 | Thomas | H02J 7/00308 |
| | | | 320/134 |
| 2009/0284240 A1 | 11/2009 | Zhang et al. | |
| 2010/0126550 A1 | 5/2010 | Foss | |
| 2016/0023571 A1 * | 1/2016 | Wu | B60L 53/20 |
| | | | 320/112 |
| 2016/0339858 A1 * | 11/2016 | Fink | B60R 16/033 |
| 2017/0005371 A1 | 1/2017 | Chidester et al. | |
| 2017/0033595 A1 * | 2/2017 | Mandarino | H02J 3/0073 |

FOREIGN PATENT DOCUMENTS

KR 20210007554 A * 1/2021 .............. B60L 58/19

OTHER PUBLICATIONS

Hassanpoor et al., "Tolerance-Band Modulation Methods for Modular Multilevel Converters," Presented at the EPE Conference, Lillie, France, on Sep. 3, 2013, 10 pages.
Lee et al., "Design Considerations for Parallel Differential Power Processing Converters in a Photovoltaic-Powered Wearable Application," Energies, Nov. 2018, 11(3329), 17 pages.

* cited by examiner

*Primary Examiner* — Chun Cao
(74) *Attorney, Agent, or Firm* — Fish & Richardson P.C.

(57) ABSTRACT

An apparatus and method for dual power unit power distribution. In an aspect, a system includes a first power unit and a second power unit, each operable to store and provide power to a load. A first switch is interposed between the first power unit and a power bus, and a second switch interposed between the second power unit and the power bus. A bidirectional power conveyor is connected to the first power unit and connected to the second power unit, and is operable to convey power between the first power unit and the second power unit independent of respective voltages of the first power unit and the second power unit.

28 Claims, 11 Drawing Sheets

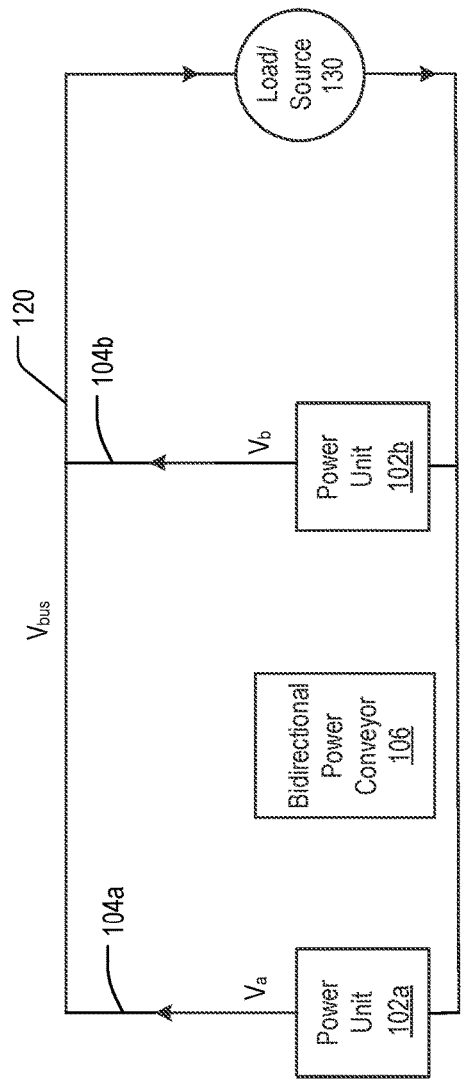
FIG. 3G
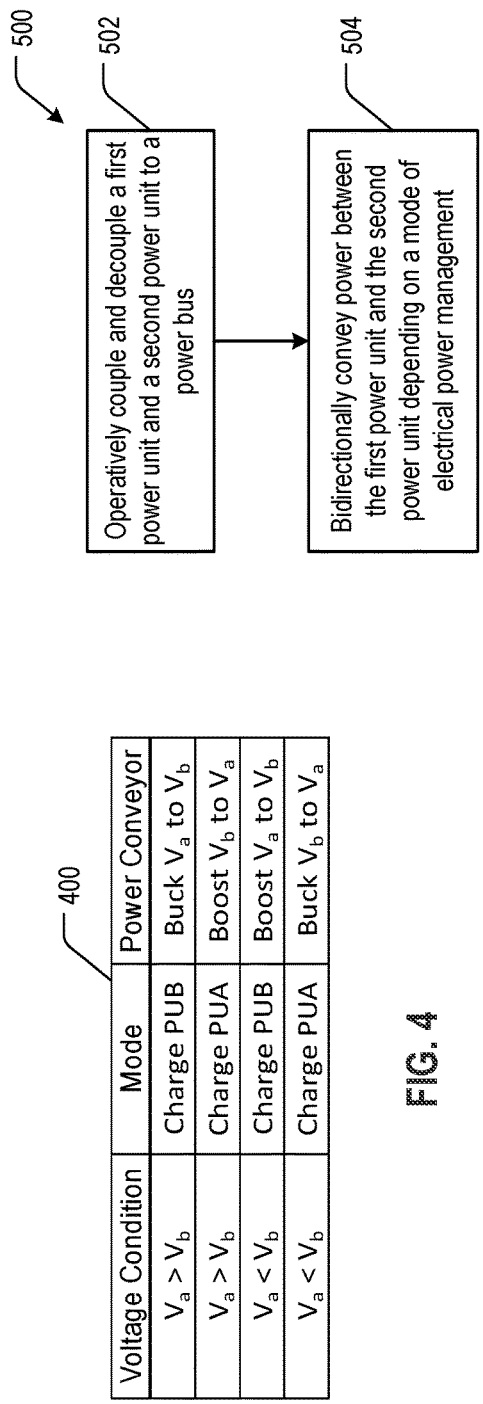
FIG. 4
FIG. 5

DUAL POWER UNITS BASED POWER DISTRIBUTION SYSTEM

TECHNICAL FIELD

This disclosure generally relates to managing dual power units that provide, and optionally receive, power from a power bus.

BACKGROUND

In small electrical devices, such as electrical scooter, electrical three-wheeler, small electrical cart, or battery based power storage systems, consumers may prefer relatively small electrical batteries rather than one large battery. The relatively small size of the electrical batteries facilities easy replacement of the battery units. However, a vehicle that runs run on a single small battery may not have enough power to perform certain tasks, e.g., rapid acceleration, due to the small size of the battery. Accordingly, an additional battery may be added to the vehicle power system.

However, when an electrical power system includes multiple electrical power units connected to a power bus, the power units that are connected to the same power bus in parallel should have practically equal voltages. Paralleling power units with unequal voltages can be inefficient and potentially dangerous. Accordingly, the voltages on the batteries must be balanced in voltage to be concurrently connected to the power bus.

SUMMARY

In general, the disclosure is directed to a switchable power distribution system for one or more dual power units. As used in this specification, a dual power unit includes two separate power units that can be selectively connected and disconnected to a bidirectional power bus, or one to the other by a power conveyor connected between the two power units. A control system controls the dual power unit to place the dual power unit in a number of different modes of power sharing that are described in more detail below.

Specifically, for a given dual power unit, the disclosed systems and techniques relate to selectively connecting and disconnecting power units of the dual power unit to the bidirectional power bus in a manner that a first of the two power units provides (or receives) energy from the power bus, and a second of the two power units is not connected to the power bus and can provide (or receive) energy from the first power unit by means of a power conveyor. In yet another mode in which multiple sets of dual power units are used, two or more power units can be connected in parallel to the bus. In some implementations of this mode, each power unit that is connected to the bus is a power unit from a separate set of dual power units.

In general, one innovative aspect of the subject matter described in this specification may be embodied a system that An electrical power management system, comprising: one or more dual power units, each dual power unit comprising: a first power unit that is operable to store and provide power to a load, a second power unit that is operable to store and provide power to a load, a first switch interposed between the first power unit and a power bus, the first switch operable to couple the first power unit to the power bus when in a closed state and operable to isolate the first power unit from the power bus when in an open state, a second switch interposed between the second power unit and the power bus, the second switch operable to couple the second power unit to the power bus when in a closed state and operable to isolate the second power unit from the power bus when in an open state, and a bidirectional power conveyor connected to the first power unit and connected to the second power unit, and operable to convey power between the first power unit and the second power unit independent of respective voltages of the first power unit and the second power unit.

In a variation of the above, for each of the one or more dual power units: the first switch interposed between the first power unit and the power bus is connected to the first power unit at a first node; the second switch interposed between the second power unit and the power bus is connected to the second power unit at a second node; and the bidirectional power conveyor is connected to the first power unit at the first node and connected to the second power unit at the second node, and further connected to the first power unit and the second power unit at a third node.

In a variation of the above, in response to control signals provided to the first switch, the second switch, and the bidirectional power conveyor of a particular dual power unit, the dual power unit: isolates the second power unit from the power bus by the second switch and cause the second power unit to convey power to the first power unit by the bidirectional power conveyor; and couples the first power unit to the power bus by the first switch to convey power to the load.

In a variation of the above, the bidirectional power conveyor of the particular dual power unit is configured by the control signals to operate in a boost mode to convey power from the second power unit to the first power unit when an output voltage of the first power unit is greater than an output voltage of the second power unit.

In a variation of the above, the bidirectional power conveyor of the particular dual power unit is configured by the control signals to operate in a buck mode to convey power from the second power unit to the first power unit when an output voltage of the first power unit is less than an output voltage of the second power unit.

In a variation of the above, in response to control signals provided to the first switch, the second switch, and the bidirectional power conveyor of the particular dual power unit, the particular dual power unit: isolates the second power unit from the power bus by the second switch; and couples the first power unit to the power bus by the first switch to convey power to the load and convey power the second power unit by the bidirectional power conveyor.

In a variation of the above, the bidirectional power conveyor of the particular dual power unit is configured by the control signals to operate in a buck mode to convey power from the first power unit to the second power unit when an output voltage of the first power unit is greater than an output voltage of the second power unit.

In a variation of the above, in response to control signals provided to the first switch, the second switch, and the bidirectional power conveyor of the particular dual power unit: the first power unit is connected to the power bus by the first switch and receives power from the power bus; the second power unit is isolated from the power bus by the second switch; and the bidirectional power conveyor is configured by the control signals to convey power from the first power unit to the second power unit.

In a variation of the above, the bidirectional power conveyor of the particular dual power unit is configured by the control signals to operate in a buck mode to convey power from the first power unit to the second power unit when an output voltage of the first power unit is greater than an output voltage of the second power unit.

In a variation of the above, each of the one or more dual powers unit includes a controller, and the control signals for the particular dual power unit are generated by the controller of the dual power unit.

In a variation of the above, each of the one or more dual power units receive the control signal from a control system that is external to each of the one or more dual power units.

In a variation of the above, the control signals provided to the bidirectional power conveyor cause the bidirectional power conveyor to operation the bidirectional power conveyor in borderline current mode (BCM).

In a variation of the above, for each of the one or more dual power units: the first switch and the second switch are bidirectional MOSFET switches, and each bidirectional MOSFET switch comprises a first MOSFET and a second MOSFET connected together by their respective sources, and wherein a respective drain of each first MOSFET is connected to a respective power unit, and a respective drain of each second MOSFET is connected to the power bus; and the controller is configured to provide control signals to the first switch and the second switch to cause the first switch and second switch to provide gate control signals to each bidirectional MOSFET switch during an initialization phase that causes each first MOSFET to be turned on and fully conducting and each second MOSFET to be turned off.

In a variation of the above, each of the first power unit and the second power unit are selected from the group consisting of: a lithium-ion battery, a lead battery, a fuel cell, or a solar cell.

In a variation of the above, the first switch and/or the second switch is one of a unidirectional switch, a bidirectional switch, a diode, or a MOSFET.

In a variation of the above, the bidirectional power conveyor is selected from the group consisting of: a Buck-Boost converter, a dual-active bridge, and a resonant converter.

In a variation of the above, the bidirectional power conveyor comprises interleaved bidirectional power conveyor comprising a plurality of interleaved bidirectional power conveyor that each operate at respectively different phases from each other.

In a variation of above, the electrical power management system includes: a plurality of dual power units; a control system the monitors voltages and currents within the electrical power management system in response generates and provides control signals to each of the plurality of dual power units, wherein: the control system determines that a first power unit in a first dual power unit and a first power unit in a second dual power unit have respective output voltages that are within a threshold connection level of each other, and in response generates control signals that cause: the first power unit of the first dual power unit to connect to the power bus, and the second power unit of the first dual power unit to isolate from the power bus; and the first power unit of the second dual power unit to connect to the power bus, and the second power unit of the second dual power unit to isolate from the power bus.

In a variation of the above, the control signals cause: the bidirectional power conveyor of the first dual power unit to convey power between the first power unit and the second power unit of the first dual power unit; and the bidirectional power conveyor of the second dual power unit to convey power between the first power unit and the second power unit of the second dual power unit; thereby conveying power between the first power unit and the second power unit of the first dual power unit and the first power unit and the second power unit of the second dual power unit.

Another innovative aspect of the subject matter described in this specification may be embodied in methods that include the operations of, in at least one of one or more dual power units: operatively coupling and decoupling a first power unit and a second power unit to a power bus that provides power to a load, where each of the first power unit and the second power unit are operable to store and provide power to the load; and bidirectionally conveying power between the first power unit and the second power unit depending on a mode of electrical power management, comprising: in a first mode, coupling the first power unit to the power bus to convey power from the first power unit to the load, isolating the second power unit from the power bus, and conveying, by a bidirectional power conveyor, power from the second power unit to the first power unit.

In a variation of the above, the operations include: in the first mode, operating the bidirectional power conveyor in a boost mode when an output voltage of the second power unit is less than an output voltage of the first power unit; and in the first mode, operating the bidirectional power conveyor in a buck mode when an output voltage of the second power unit is greater than an output voltage of the first power unit.

In a variation of the above, bidirectionally conveying power further comprises the operations of: in a second mode, coupling the first power unit to the power bus to receive power from the load, isolating the second power unit from the power bus, and conveying, by the bidirectional power conveyor, power from the first power unit to the second power unit.

In a variation of the above, the operations include: in the second mode, operating the bidirectional power conveyor in a boost mode when an output voltage of the first power unit is less than an output voltage of the second power unit; and in the second mode, operating the bidirectional power conveyor in a buck mode when an output voltage of the first power unit is greater than an output voltage of the second power unit.

In a variation of the above, operatively coupling and decoupling the first power unit and the second power unit to a power bus is done by operatively controlling bidirectional MOSFET switches that are respectively connected to the first power unit and the second power unit, and each bidirectional MOSFET switch comprises a first MOSFET and a second MOSFET connected together by their respective sources, and wherein a respective drain of each first MOSFET is connected to a respective power unit, and a respective drain of each second MOSFET is connected to the power bus, and the operations comprise: providing gate control signals to each bidirectional MOSFET switch during an initialization phase that causes each first MOSFET to be turned on and fully conducting and each second MOSFET to be turned off.

In a variation of the above, bidirectionally conveying power between the first power unit and the second power unit depending on a mode of electrical power management comprises operating the bidirectional power conveyor in borderline current mode (BCM).

Some implementations of the subject matter described herein may realize, in certain instances, one or more of the following advantages. Voltage balancing between the two power units need not be precise as only a single power unit is connected to the power bus, and the other power unit that is not connected to the power bus may still be power coupled (i.e., provide power to or receive power from) to the power unit connected to the power bus by means of the power conveyor. Because the power conveyor provides power coupling despite the voltage level differences between the two power units, power can be conveyed between the units without damage that might result when power units of different voltages are connected in parallel to the power bus. Additionally, the subject matter of this disclosure facilitates using small and relatively portable power units (e.g., batteries) in small electrical conveyances that, under most operating conditions, require only the power output of a single of such power units. However, for conditions that require more power than can be provided by the single power unit, power can be provided by the second power unit to the first power unit by means of the power conveyor. This enables the use of two power units with individual performance specifications that are less than performance specifications of a larger power unit. Accordingly, smaller and less expensive power units may be used in the electronic device than would otherwise be required if a single power unit were used.

In some implementations, when voltages of two power units are within a threshold connection value of each other, both power units may be connected to the bus. Should the voltages of the connected power units then change so that they are not within the threshold connection value, then one of the power units can be disconnected.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology.

FIGS. 3A-3G depict example operational modes of the dual power unit management system.

FIG. 4 is a table listing the power conveyor function during various operational modes.

FIG. 5 is a flow diagram of an example process for conveying power between two power units.

Like reference numbers and designations in the various drawings indicate like elements.

DETAILED DESCRIPTION

Figure 1:
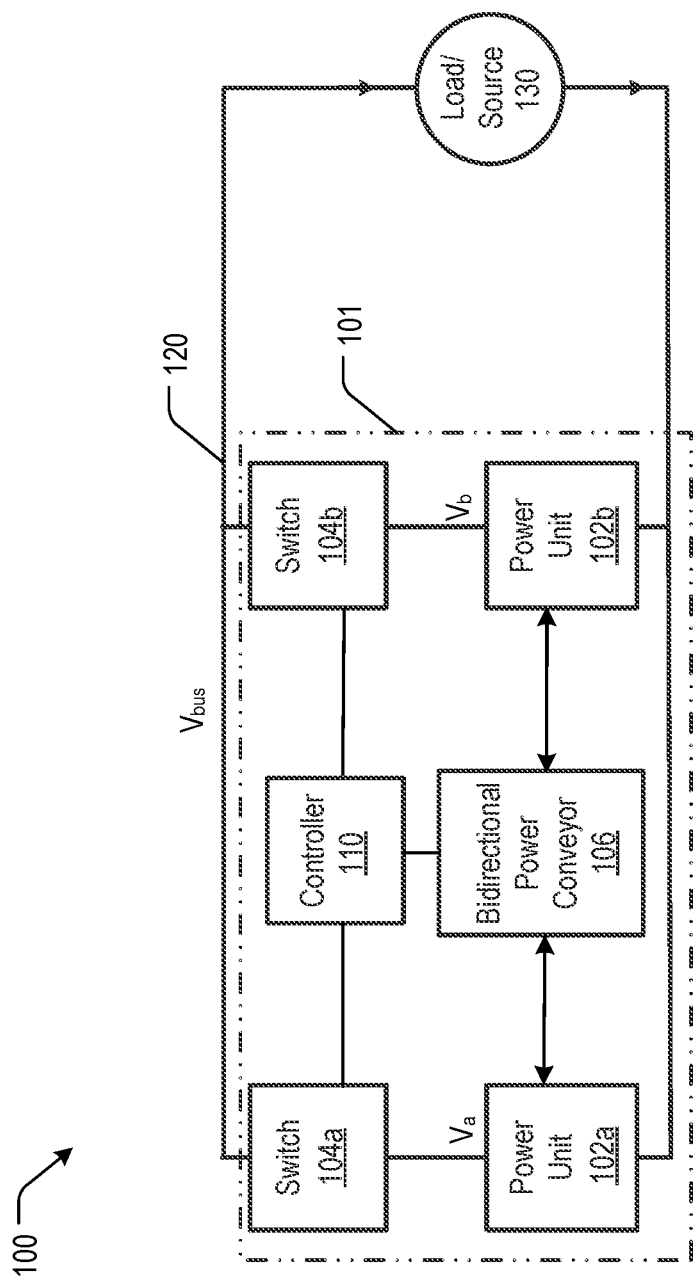
FIG. 1 depicts an example architecture of a dual power unit management system.
Figure 2:
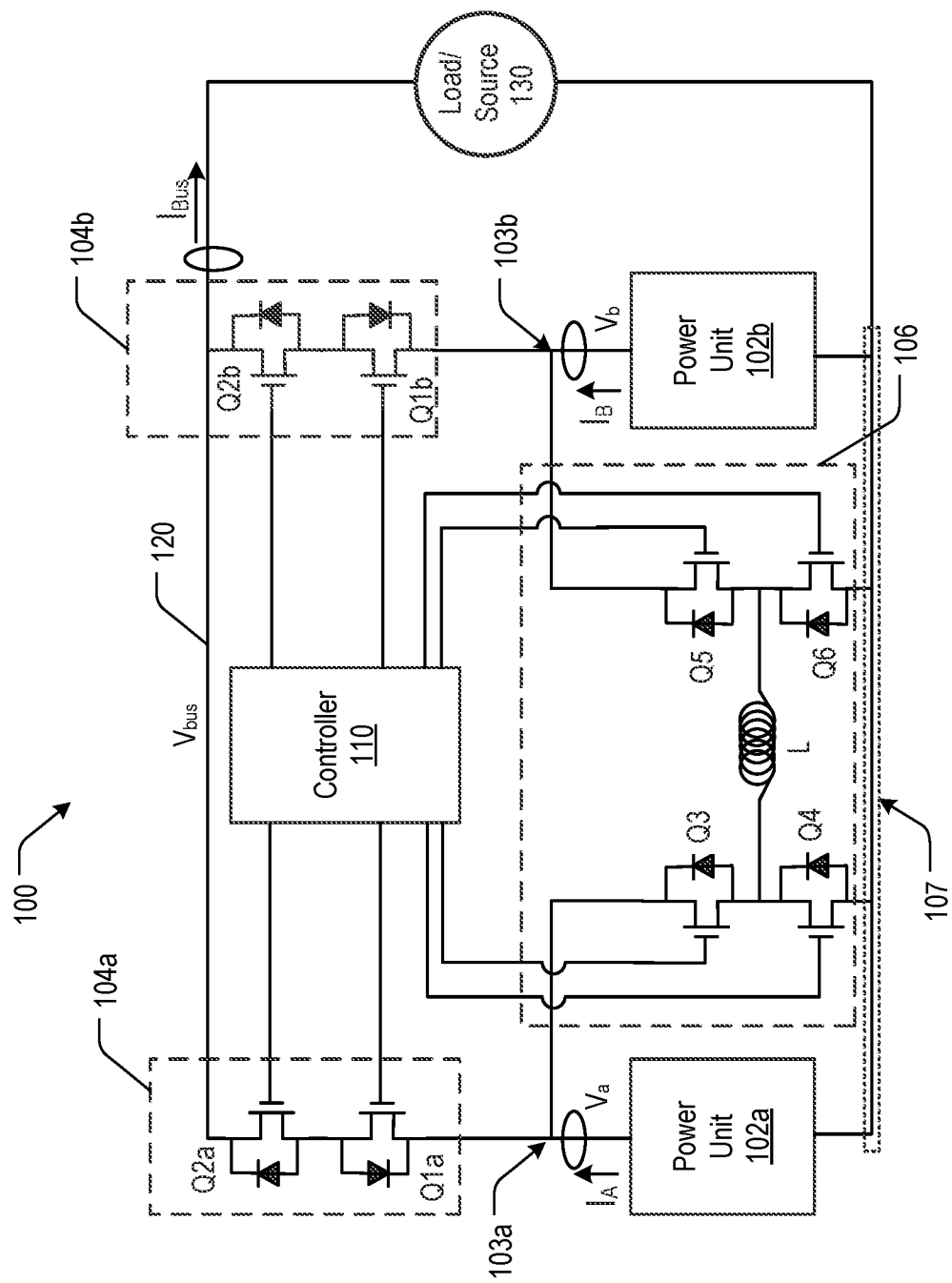
FIG. 2 depicts one example implementation of the dual power unit management system.

FIG. 1 depicts an example architecture of a dual power unit management system 100, and FIG. 2 depicts one example implementation of the dual power unit management system 100. In FIG. 1, only one dual power unit 101 is illustrated. This specification will first describe the operation of a single dual power unit 101 implementation, and will then describe how multiple dual power units 101 can also be utilized in the system 100.

The system 100 is a system that consumes energy from power units 102a and 102b, and, in some implementations, can charge the power units 102a and 102b. The system 100 can be implemented in, for example, an electric vehicle, a building power system, and/or another type of system.

The dual power unit 101 of the system 100 includes power units 102a and 102b. The power units 102 can be lead batteries, lithium-ion batteries, fuel cells, photovoltaic cells, solar cells, and/or another device for providing electrical power to (or, optionally, receiving power from) a power bus 120.

The power units 102a and 102b are respectively connected to switches 104a and 104b, which, in turn, are connected to a bidirectional power bus 120. As shown in more detail in FIG. 2, each switch 104 is interposed between power unit 102 and the power bus 120 and connected to a respective power unit 102 at a respective node 103, e.g., a voltage output of the power unit 102. Each switch 104 is operable to couple the power unit 102 to the power bus 120 when in a closed state ("On") and operable to isolate the power unit 102 from the power bus 120 when in an open state ("Off").

The switches 104 of the dual power unit 101 can all be of the same type, or one or more or each of the switches can be of a different type. The switches 104 can a bidirectional switch, a unidirectional switch, a diode, a single MOSFET switch, a bidirectional MOSFET switch, a contactor and/or another type of switch. Typically, a bidirectional switch is used to enable regeneration charging of the power units 102a and 102b. However, if regeneration is not required, then a single diode may be used as a switch.

In some examples, a switch 104 can operate in an "on" state and in an "off" state. When the switch 104 is in an "on" state, the switch 104 electrically connects the corresponding power unit 102 to the power bus 120. When a switch 104 is in an "off" state, the switch electrically disconnects the corresponding power unit 102 to the power bus 120. In the case of a bidirectional MOSFET switch, however, the switch may be configured to connect the power unit 102 to the power bus 120 when the voltage output of the power unit 102 exceeds the voltage of the power bus 120 by a threshold amount required to turn on the MOSFET diode.

As shown in more detail in FIG. 2, a bidirectional power conveyor 106 of the dual power unit 101 has a first connection point (e.g., the drain of MOSFET Q3) that is connected to the first power unit 102a at the respective first node 103a and a second connection point (e.g., the drain of MOSFET Q5) connected to the second power unit 102b at the respective second node 103b. The power conveyor 106 also has a third connection point (e.g., the source of MOSFET Q4) and a fourth connection point (e.g., the source of MOSFET Q6) connected to a third node 107 that is common node to the first power units 102a and 102b. The bidirectional power conveyor 106 is operable to convey power between the first power unit 102a and the second power unit 102b independent of respective voltages of the first power unit 102a and the second power unit 102b, i.e., the voltages of the first power unit 102a and the second power unit 102b need not be the same to convey power between them.

Any controllable power conveyor that can couple two power units having different output voltages and that can convey power between the two power units can be used. Examples of such power conveyors include buck-boost converters, a dual active bridge, a resonant converter, and/or another type of power conveyor. For the remainder of this written description, a buck-boost converter is described in an example implementation, but the system 100 is not limited to this particular type of power conveyor.

A controller 110 is operatively coupled to the power conveyor 106 and, if necessary, the switches 104 (i.e., in implementations in which the switches 104 are not simply diodes). The controller 110, depending on the implementations and topology used, is operable to monitor currents and/or voltages and control the power conveyor 106 and switches 104a and 104b to selectively connect and disconnect the power units 102a and 102b to and from the power bus 120. In particular, the switches 104a and 104b and the power conveyor 106 are operatively controlled in a manner that a first of the two power units 102a or 102b provides (or receives) energy from the power bus 120, and a second of the two power units 102b or 102a is not connected to the power bus 120 and provides (or receives) energy from the first power unit by the power conveyor 106. Such operation is described in more detail below. The controller may be a programmable microcontroller, a field programmable gate array (FPGA), and application specific integrated circuit (ASIC), a microprocessor, or any other hardware device or combination of hardware and software that can be configured to carry out the operations described in this written description.

The implementation of FIGS. 1 and 2 shows a single controller 110 for the dual power unit 101. When multiple (e.g., n) dual power units 101 are used, a single controller 110 (or control system) can be used to control all n dual power units 101. Alternatively, in some implementations, each dual power unit 101 may have its own controller 110, and the controllers 110 may, in turn, communicate data with each other to manage all n dual power units 110 concurrently. In another implementation, the controllers 110 may communicate with an external control system that receives data from the controllers 110 and provides commands to the controllers to control all n dual power units.

In some examples, the load/source 130 is an electric motor, a power inverter, electrical machinery, a supercapacitor, a solar array, and/or another load on the power bus 120 and/or power source to the power bus 120. In some examples, the load/source 130 can alternate between operating as a load that consume energy from the power units 102 an operating as a source that provides energy to charge the power units 102. In some examples, the load/source 130 can have instances of regeneration, e.g., electric vehicle regeneration.

In an example context, the system 100 can be an electric vehicle. The load/source 130 can be an electric motor of the electric vehicle. The power units 102a and 102b can be batteries of the electric vehicle. The batteries can provide electrical power to the electric motor through the power bus 120. Moreover, in some implementations, the electric motor of the vehicle can provide electrical power to the batteries by regeneration.

Figure 8:
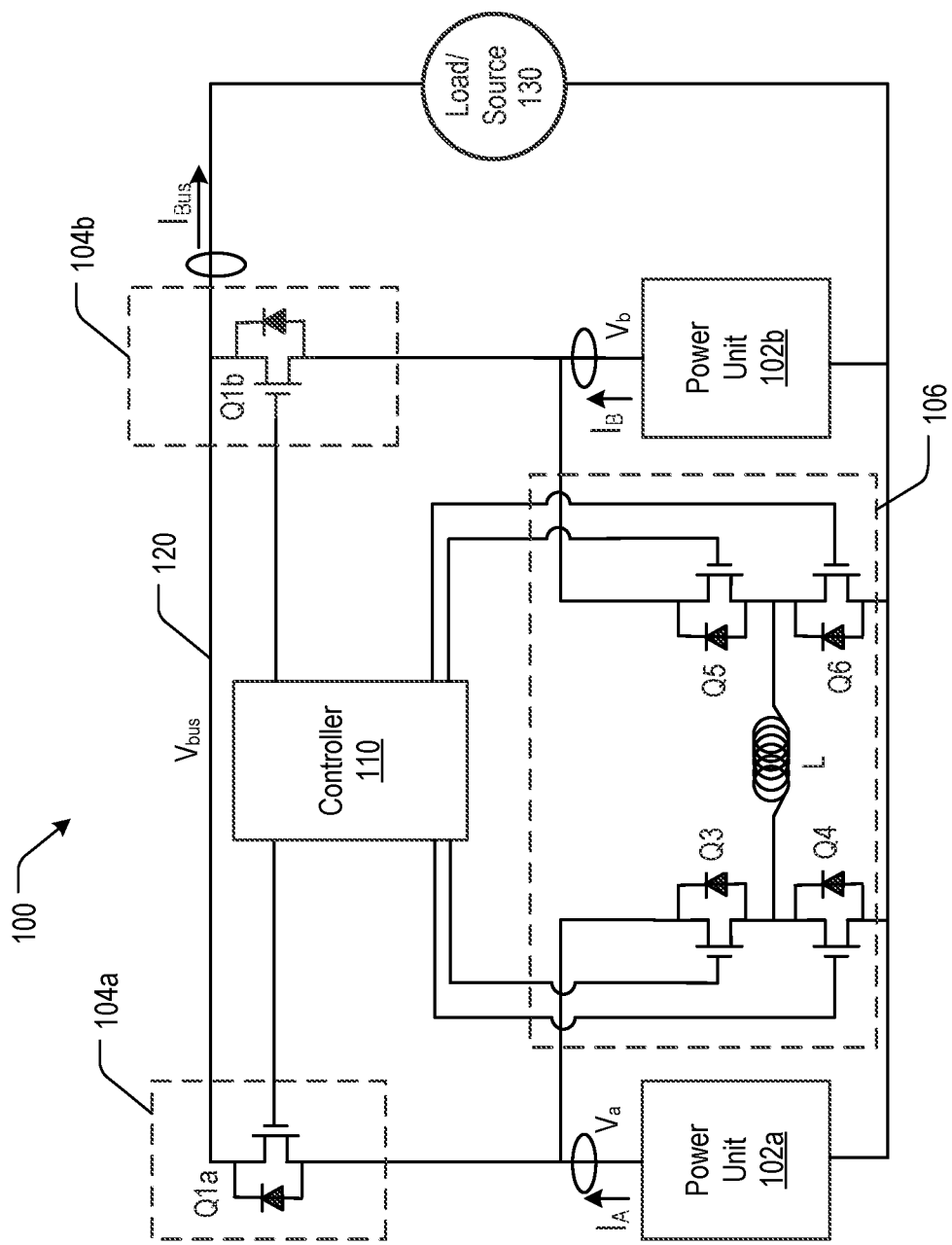
FIG. 8 is an implementation of the dual power unit management system that utilizes single gate transistors as bus switches.

Example electric vehicles can include road-going vehicles, off-road vehicles, constructions equipment, rail vehicles, fixed-wing aerial vehicles, rotary wing aerial vehicles, surface marine vessels, personal mobility vehicles, bicycles, and/or other types of vehicles. The disclosed systems and techniques need not be applied in the context of a vehicle, and can be applied in other contexts. For example, the system 100 can be a building, a power generation system, a power distribution system and/or another type of power generating system or power consuming system. Some example systems that can be implemented with the disclosed parallel power distribution and charging system are depicted in FIG. 8

In the example implementation of FIG. 2, the switches 104 are bidirectional MOSFET switches—a first MOSFET Q1 and a second MOSFET Q2 (i.e., MOSFETs Q1a and Q2a for switch 104a, and MOSFETs Q1b and Q2b for switches 104b). The first MOSFET Q1 and the second MOSFET Q2 are connected together by their respective sources. The drain of the first MOSFET Q1 is connected to an output of the power unit 102, and the drain of the second MOSFET Q2 is connected to the power bus 120. The power conveyor 106 is implemented as a buck-boost converter using the buck-boost switching topology as depicted by transistors Q3, Q4, Q5, and Q6, and inductor L. Other example switch 104 implementations are described with reference to FIGS. 8 and 9 below.

The controller 110 monitors currents $I_A$, $I_B$, and $I_{Bus}$. Note the arrows depicting the flow of current are illustrative only, and currents may flow in opposite directions as indicated, depending on the mode of operation of the system 100. Output voltages of the power units 102a and 102b ($V_a$ and $V_b$) and the power bus voltage $V_{bus}$ may also be monitored. The controller 110, based on the monitored signals, generates gate signals for the transistors Q1a, Q2a, Q1b, Q2b, Q3, Q4, Q5 and Q5. These signals operatively control the switches 104a and 104b and the power conveyor 106 to selectively connect and disconnect the power units 102a and 102b to and from the power bus 120 in combination with operating the power conveyor 106 in buck or boost mode in either direction. The duty cycles required for operating the transistors Q3, Q4, Q5 and Q5 are dependent on the difference between the voltages $V_a$ and $V_b$ and the characteristics (i.e., inductances, etc.) of the of the power conveyor 106.

In an implementation, the controller 110 is configured to provide control signals to the first and second switches 104a and 104b during an initialization phase that causes each first MOSFET Q1 (i.e., Q1a and Q1b) to be turned on and fully conducting and each second MOSFET Q2 (i.e., Q2a and Q2b) to be turned off. This prevents the power bus 120 from floating, because when the bottom MOSFETs Q1a and Q1b are on, the power unit 102a or 102b with the highest voltage will connect to the bus by virtue of the body diode of the transistor Q2a or Q2b. For example, assume the power unit 102a has an output voltage that is 3V greater than the output voltage of the power unit 102b. In this situation, the diode of Q2a turns on to connect the power unit 102a to the power bus 120. In response to the current signals thus generated, the controller 110 may then turn on the transistor Q2a, thereby eliminating the diode drop, and shut off transistor Q1b.

FIGS. 3A-3G depict example operational modes of the dual power unit management system 100. To avoid congestion in the drawings, the controller is omitted from FIGS. 3A-3F is omitted.

Figure 3A:
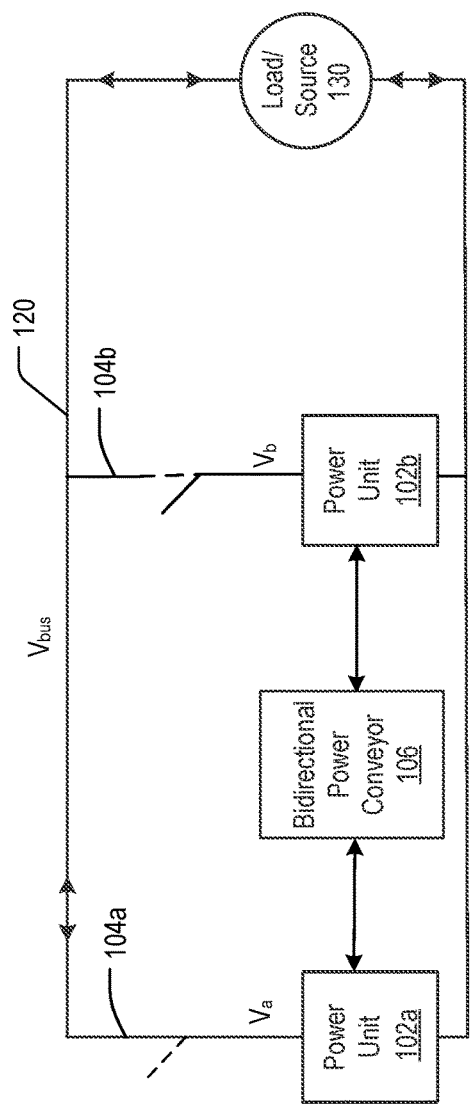

FIG. 3A depicts the various modes of operation. In general, depending on the switch configurations, the battery voltage levels, and whether the load/source 130 is drawing power or providing regenerative power, current may flow in either direction in both power units 102a and 102b, the power conveyor 106, and the power bus 120. Alternatively, current may not flow in a particular power unit 102 or the power conveyor 106, depending on the mode of operation.

Example modes are described in FIGS. 3B-3F. Additional modes than just those described in FIGS. 3B-3F can also be realized, however.

In each of FIGS. 3B-3F, current is flowing in the direction as indicated by the arrows in the bus lines. In the examples in which the power conveyor 106 is active, power is flowing in the direction of the arrows leading into and out of the power conveyor 106.

Figure 3B:
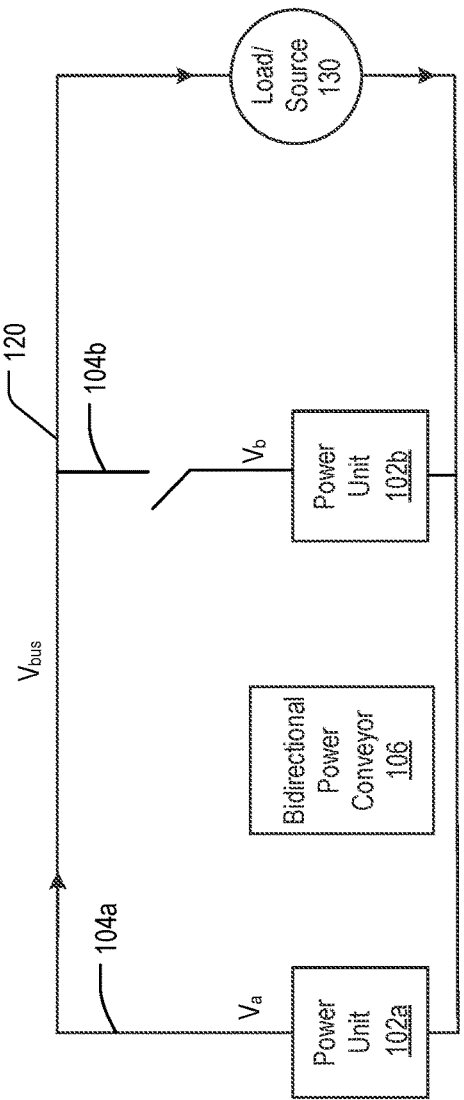

In FIG. 3B, the load 130 is being powered by the power unit 102a. The power unit 102b is isolated from the power bus 120 by the switch 104b being in the open position, and isolated from the power unit 102a by the power conveyor 106 being in an open state (e.g., switches Q5 and Q6 being open). This mode may be used, for example, with both power units 102a and 102b are fully charged, and the power unit 102a does not need additional power from power unit 102b (e.g., the vehicle is not accelerating).

Figure 3C:
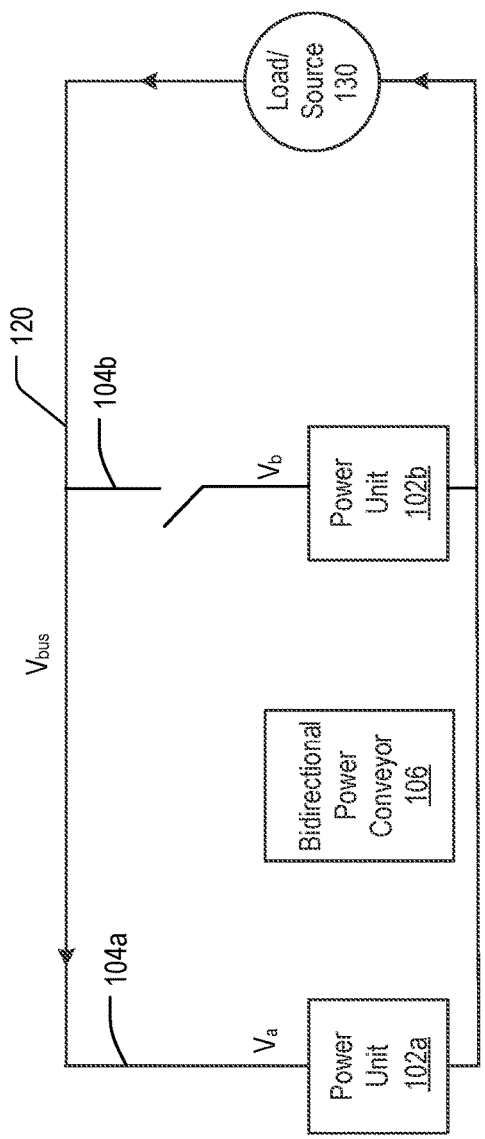

In FIG. 3C, the load 130 is acting as a source and the controller 110 has configured the system to allow the power unit 102a to be charged. The power unit 102b isolated from the power bus 120 by the switch 104b being in the open position, and again isolated from the power unit 102b. This mode may be used, for example, with power unit 102a is not fully charged and the power unit 102b is fully charged. For example, the vehicle in which the system 100 is implemented may be coasting down a hill, thus providing an opportunity for energy regeneration to charge the power unit 102a.

Figure 3D:
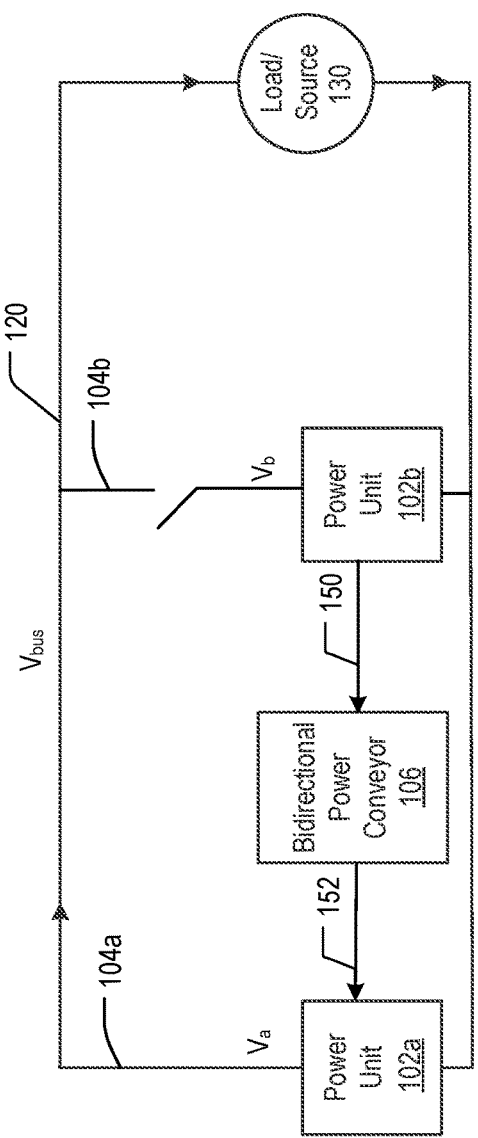

FIG. 3D depicts a power sharing mode for providing power to a load. The controller 110 has configured the switches 104a and 104b so that the power unit 102a is connected to the power bus 120 and the power unit 102b is disconnected from the power bus 120. However, the controller 110 has also configured the power conveyor 106 to couple the power units 102a and 102b in a manner that the power unit 102b provides power to the power unit 102a, as indicated by flow arrows 150 and 152. This mode may be used, for example, when the power unit 102a is selected as the main power source for the vehicle and needs additional power from the power unit 102b (e.g., the vehicle is accelerating at a rate that the power unit 102a needs assistance from the power unit 102b).

The operation the power conveyor 106 is performing will depend on the output voltages of the power units 102a and 102b. For example, when the output voltage $V_a$ of the first power unit 102a is less than the output voltage $V_b$ of the second power unit 102b, the power conveyor 106 will operate in a buck mode to step down the voltage $V_b$ to $V_a$. Conversely, when the output voltage $V_a$ of the first power unit 102a is greater than the output voltage $V_b$ of the second power unit 102b, the power conveyor 106 will operate in a boost mode to step up the voltage $V_b$ to $V_a$.

Figure 3E:
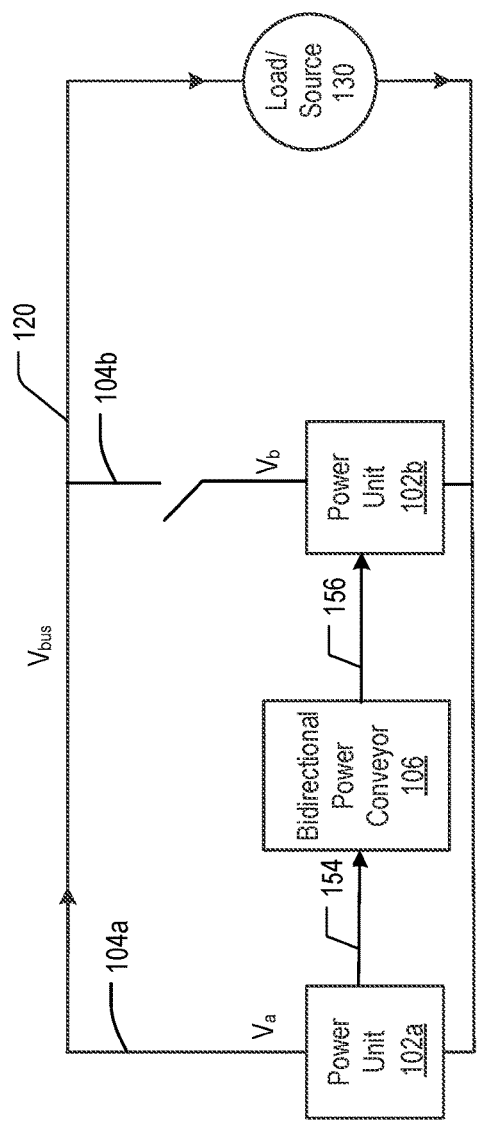

FIG. 3E depicts another power sharing mode for providing power to a load and for charging a power unit. The controller 110 has configured the switches 104a and 104b so that the power unit 102a is connected to the power bus 120 and the power unit 102b is disconnected from the power bus 120. However, the controller 110 has also configured the power conveyor 106 to couple the power units 102a and 102b in a manner that the power unit 102a provides power to the power unit 102b, as indicated by the flow arrows 154 and 156. This mode may be used, for example, when the power unit 102a is selected as the main power source for the vehicle and does not need power from the power unit 102b (e.g., the vehicle is idling and only requires little power).

Once again, the operation the power conveyor 106 is performing will depend on the output voltages of the power units 102a and 102b. For example, when the output voltage $V_a$ of the first power unit 102a is greater than the output voltage $V_b$ of the second power unit 102b, the power conveyor 106 will operate in a buck mode to step down the voltage $V_a$ to $V_b$. Conversely, if the output voltage $V_a$ of the first power unit 102a is less than the output voltage $V_b$ of the second power unit 102b, the power conveyor 106 will operate in a boost mode to step up the voltage $V_a$ to $V_b$.

Figure 3F:
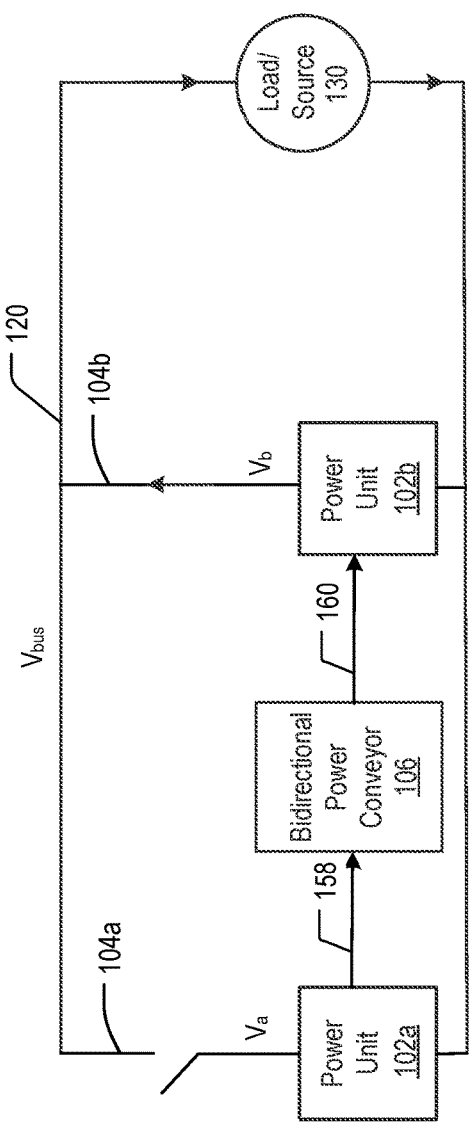

FIG. 3F depicts a mode that accommodates a power unit 102 that has a voltage that is higher than the voltage the power bus 120 requires. For example, assume that the power unit 102a output voltage $V_a$ is greater than the power unit 102 output voltage $V_b$, and too high for the load 130. The controller 110 may configure the switches 104a and 104b so that the power unit 102a is isolated from the power bus 120 and the power unit 102b is connected to the power bus 120. The controller 110 also configures the power conveyor 106 to provide power from the first power unit 102a to the second power unit 102b (as indicated by the flow arrows 158 and 160) by operating in a buck mode.

FIG. 3G depicts a mode in which both power units 102a and 102b are connected to the power bus 120. The can occur when the controller determines the voltages of the power units 102a and 102b are within a threshold connection level of each other, e.g., $|V_a-V_b|<V_T$, where $V_T$ is a voltage difference within which the two power units 102a and 102b may be connected to the power bus 120 without adverse effects on the system. The value $V_T$ may depend on the type of battery used, the amount of load, and other factors. When this condition occurs, both power units may be connected to the power bus. The bidirectional power conveyor 106 may be inactive in this state, or, alternatively, may provide power from one power unit to the other should one power unit voltage begin to fall relative to the other power unit voltage. The power units 102a and 102b may either provide power to the load/source 130, or receive power from the load/source 130.

FIGS. 3B-3G are not an exhaustive set of operational modes, and ways of sharing power between the power units 102a and 102b and the power bus 120 and load/source 130 may also be used.

FIG. 4 is a table listing the power conveyor function during various operational modes. The voltage condition column indicates the relative output voltages of the power units 102a and 102b, and the mode column indicates the direction of the power flow. For example, "Charge PUB" indicates the power unit 102b receives power from power unit 102a (either during an operation to charge one or both power units or when the power unit 102b is providing power to the power bus 120 and receives assistance from the power unit 102a). Likewise, "Charge PUA" indicates the power unit 102a receives power from power unit 102b (either during an operation to charge one or both power units or when the power unit 102a is providing power to the power bus 120 and receives assistance from the power unit 102b).

The power conveyor operation column indicates the operation of the power conveyor 106 for the given mode and voltage condition. For example, during the "Charge PUB" operation, when the voltage of the power unit 102a is greater than the voltage of the power unit 102b, the power conveyor will operate in a buck mode to step down the voltage from $V_a$ to $V_b$. Conversely, during the "Charge PUB" operation, when the voltage of the power unit 102a is less than the voltage of the power unit 102b, the power conveyor will operate in a boost mode to step up the voltage from $V_a$ to $V_b$, and so on as indicated in Table 4.

While MOSFETs have been illustrated in the example implementations, any appropriate semiconductor switch, e.g., BJT, MOSFET or IGBT switches, can be use.

FIG. 5 is a flow diagram of an example process 500 for conveying power between two power units. The process 500 can be implemented in the system 100 by use of the controller 110, the switches 104, and the power conveyor 106.

The process 500 operatively couples and decouples a first power unit and a second power unit to a power bus (502). For example, depending on the selected mode of operation, the first power unit 102a may be coupled to the power bus 120, and the second power unit 102b may be decoupled (isolated) from the power bus 120. Alternatively, the first power unit 102a may be decoupled from the power bus 120, and the second power unit 102b may be coupled to the power bus 120.

The process 500 bidirectionally conveys power between the first power unit and the second power unit depending on a mode of electrical power management (504). For example, depending on the voltages and current sensed by the controller 110, and whether power is being provided from the power units 102a and/or 102b to the load 130, or if power is being recaptured, the bidirectional power conveyor 106 will operate in a buck or boost mode. For example, the power conveyor 106 may be controller to operate as described with reference to FIGS. 3A-3E above, or in accordance with the table 400 of FIG. 4.

Figure 6:
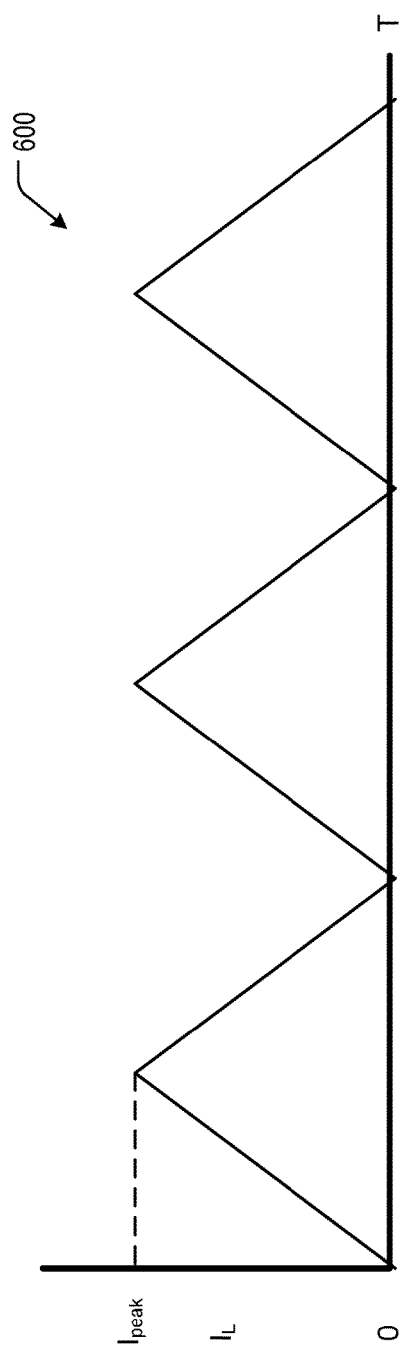
FIG. 6 is a current flow diagram illustrating borderline current mode (BCM) switching.

FIG. 6 is a current flow diagram 600 illustrating borderline current mode (BCM) switching. In an implementation, BCM is used in the power conveyor 106. While this may increase conduction losses to due to increased RMS current, the use of BCM facilitates zero voltage switching in the power conveyor transistors. This, in turn, reduces or eliminates switching losses, reverse recovery losses and noise in the MOSFET diodes, and hence results in lower EMI emissions.

Figure 7:
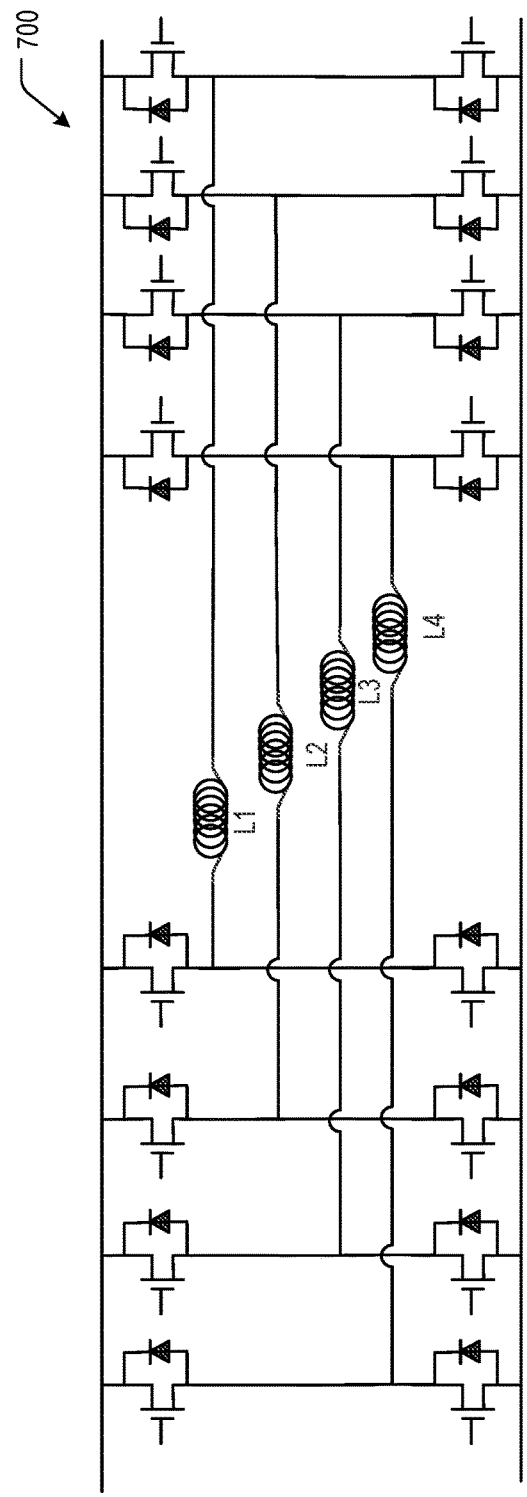
FIG. 7 is an implementation of the power conveyor that facilitates multiphase interleaved operation to reduce current ripple.

FIG. 7 is an implementation of the power conveyor 700 that facilitates multiphase interleaved operation to reduce current ripple. As shown in FIG. 7, four separate power conveyors, each connected to one of the respective inductors L1-L4, are used. The separate power conveyors are operated in different phases and interleaved in operation so that they are operated at separate periods. The currents, however, are provided to the same node, thereby reducing current ripple. The reduction of current ripple reduces battery wear.

FIG. 8 is an implementation of the dual power unit management system that utilizes single gate transistors Q1a and Q1b as bus switches. In this implementation, each switch 104a and 104b is realized by a single respective MOSFET transistor Q1a and Q1b. In this implementation, the power unit 102 voltage will not exceed the bus voltage by more than the body diode voltage.

Figure 9:
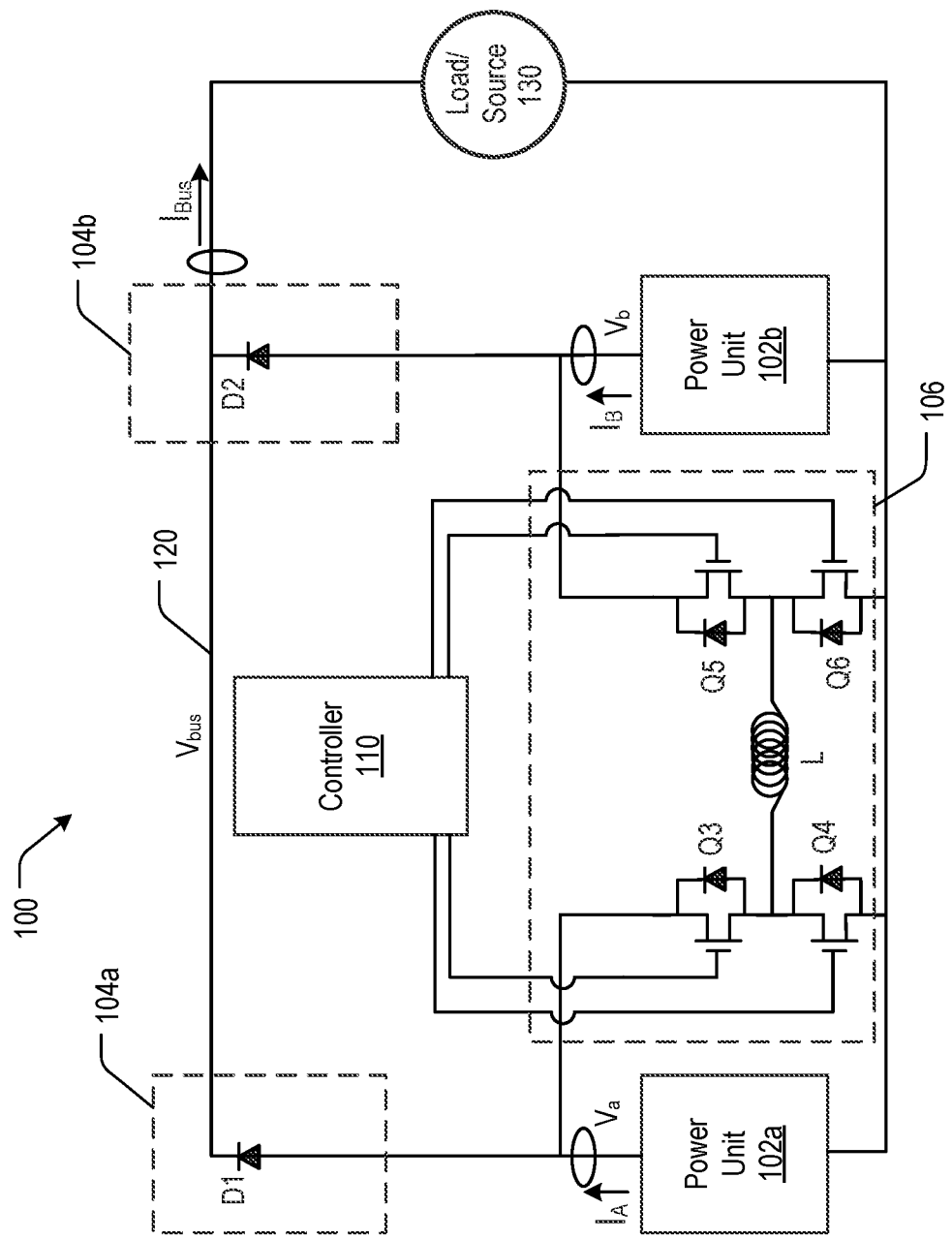
FIG. 9 is an implementation of the dual power unit management system that utilizes diodes as bus switches.

FIG. 9 is an implementation of the dual power unit management system 100 that utilizes diodes D1 and D2 as bus switches. This implementation may be used when regeneration is not required by the system. Accordingly, the power unit 102 with the highest voltage will connect to the power bus 120. The controller 110 is configured to monitor the respective voltages and/or currents and adjust the operation of the power conveyor 106 accordingly. For example, when the voltages in the power units are equal, the controller may place the power conveyor 106 in an inoperable state. Conversely, when the voltage of a power unit 102 is less than the voltage of the other power unit by a threshold amount, the controller may configure the power conveyor 106 to share power between the two power units, depending on the mode of operation (e.g., whether the power with the lower voltage is being charged by or providing assistance power to the other power unit).

Figure 10:
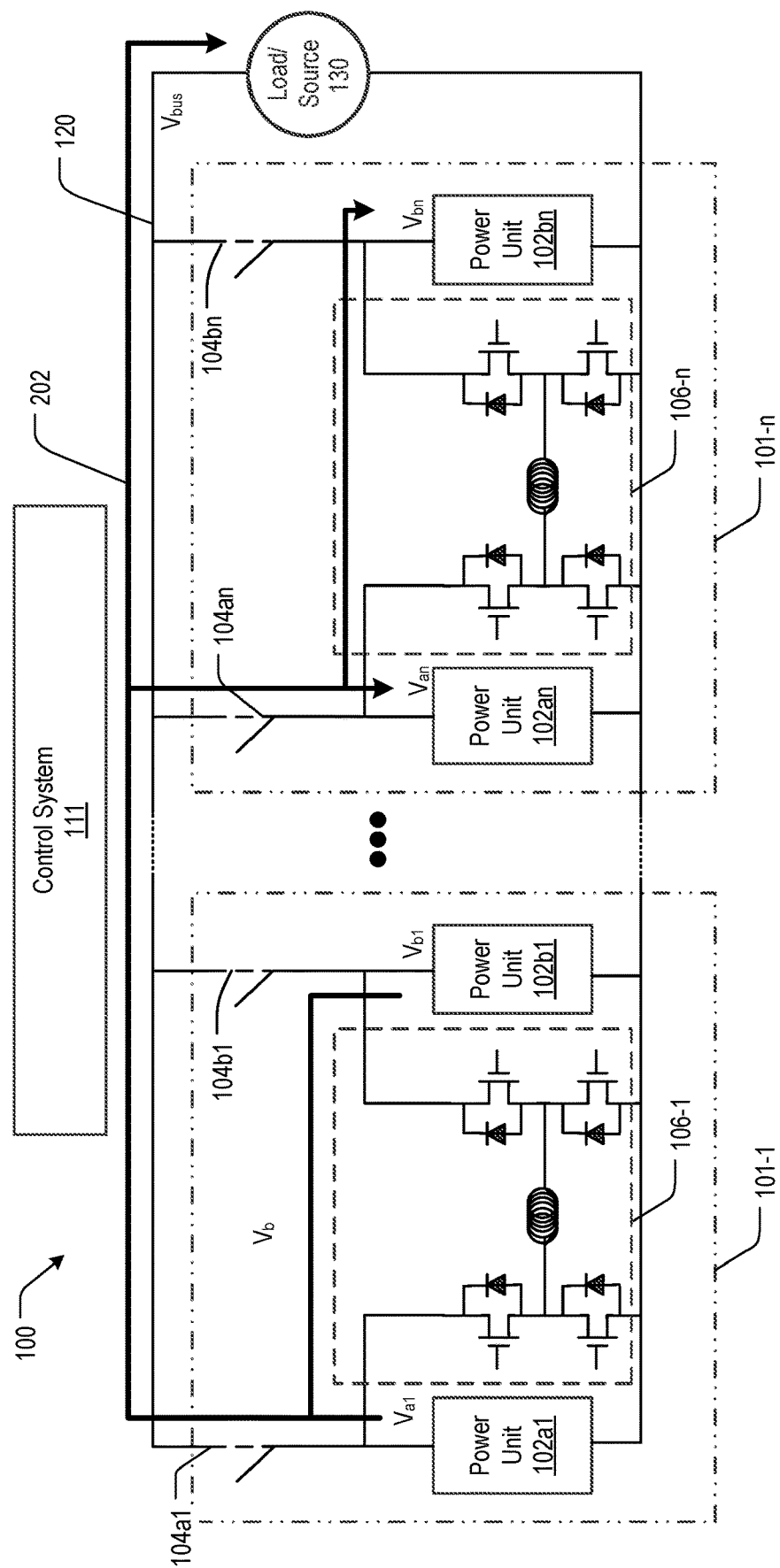
FIG. 10 is an implementation of the dual power unit management system that utilizes multiple (n) sets of dual power units.

While the examples thus far have been in the context of single dual power unit 101 that includes a pair of two power units, switches, and a single power conveyor, multiple dual power units 101 can be used in an implementation. FIG. 10 is an implementation of the dual power unit management system 100 that utilizes multiple (n) sets of dual power units 101. Each dual power unit 101 includes a pair of power units 102a and 102b, and a power conveyor 106. The control system that controls the n sets of dual power units 101 is omitted to avoid congestion in the drawings. As described above, the control system may be a set of controllers, one in each dual power unit 101 and that communicate with each other, or may be an external control system that manage all of the n dual power units 101, or a combination of individual control devices within each dual power unit and an external control device. These various control architectures are diagrammatically illustrated as a control system 111.

In one implementation, only a single dual power unit 101 of the n dual power units is operating at any one time. In this situation, the operating dual power unit operates as described above. For example, the dual power unit 101-1 may be operational, while all remaining dual power units (e.g., 101-2 . . . n) are isolated from the power bus 120.

In another implementation, multiple dual power units (e.g., two or more) may be operating at a single time. For example, assume that the voltages $V_{a1}$ and $V_{bn}$ are within a threshold connection level value so that both power units 102a1 and 102bn can be connected to the power bus without adverse effects. The threshold connection level value will depend on the type of power unit used, the rating of the power units, and the like, e.g., the two output voltages must be within 0.5V of each other. The control system for the system 100 may then connect power unit 102a1 and 102bn to the power bus 120, and isolate power units 104b1 and 104an from the bus by use of the switches 104a1, 104b1, 104an, and 104bn. All other dual power units (101-2-101-n-1) may be isolated from the power bus 120. Depending on the mode of operation, current and power may flow in various directions. For example, power unit 102a1 may provide power to the load 130, and charge power units 102an and 102bn. Assume power unit 102b1 voltage $V_{b1}$ exceeds the bus voltage $V_{bus}$; in this situation, power unit 102b1 may be isolated from the power bus 120, but provided power to the power unit 102a1 by the power conveyor 106-1. Such a power sharing flow is indicated by the flow path 202.

Multiple other power sharing configurations can also be realized. For example, in the case described above where dual power units 101-1 and 101-n are active, all four power units 102a1, 102b1, 102an, and 102bn may be charged when the load/source 130 is acting as a source. In this situation, one power unit 102 from each of the power units 101-1 and 101-n is connected to the power bus (by virtue of their respective voltages that are within a threshold tolerance of each other) and the other respective power units of each dual power unit 101-1 and 101-2 receives power form the connected power unit by use of the respective power conveyors 106-1 and 106-n.

Figure 11:
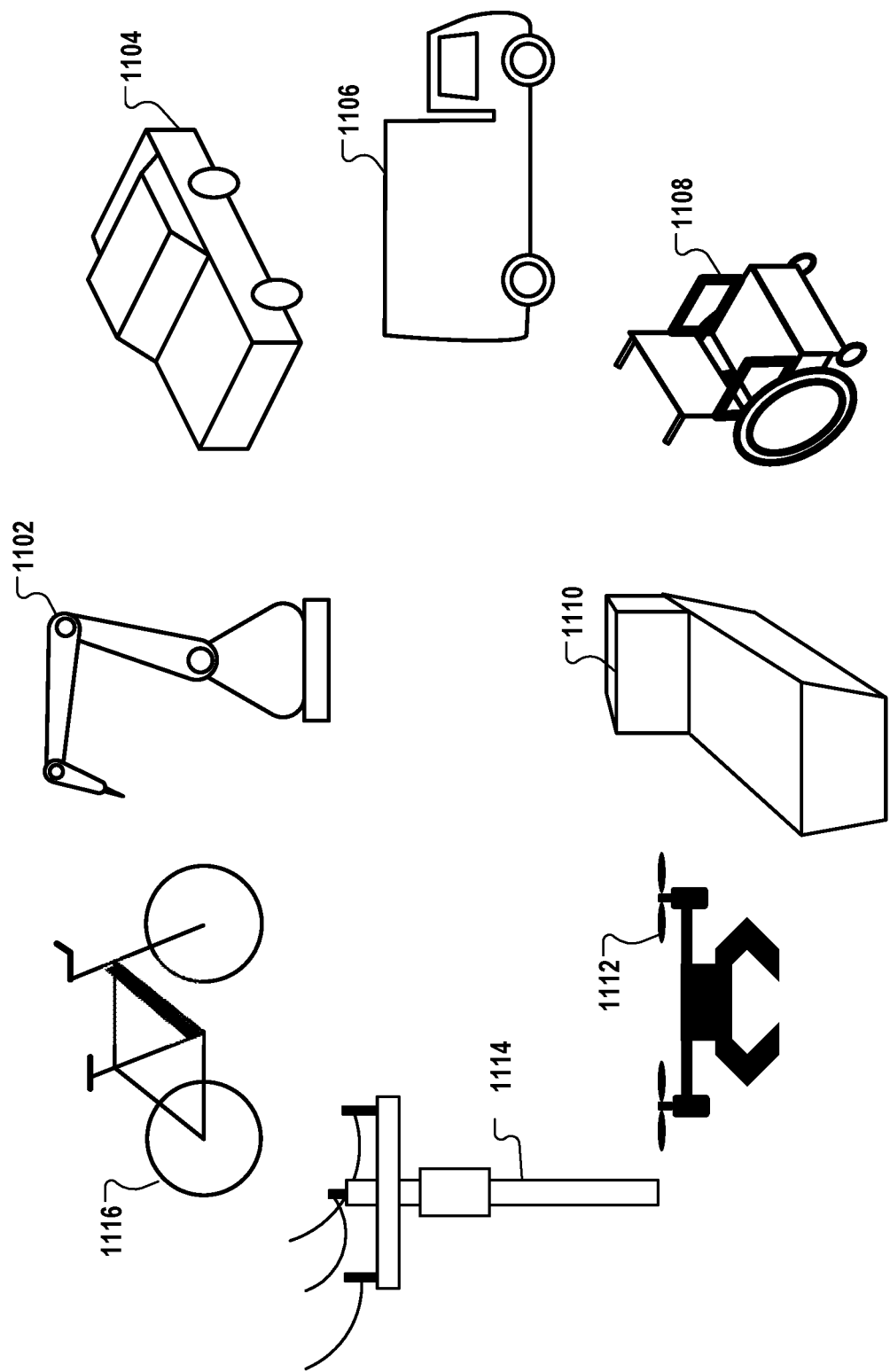
FIG. 11 depicts example systems that can be implemented with the disclosed systems and methods.

FIG. 11 depicts example systems that can be implemented with the disclosed systems and methods. Example systems can include, e.g., robotic machines 1102, cars 1104, trucks 1106, mobility assistance devices such as wheelchairs 1108, and marine vessels 1110. In some examples, the system 100 can include an aerial vehicle 1112 such as an unmanned drone. In some examples, the system 100 can be an electrical distribution system 1114 such as a power line system. In some examples, the system 100 can be a recreational vehicle 1116 such as a bicycle, three-wheeler, or small cart.

A number of implementations have been described. Nevertheless, it will be understood that various modifications may be made without departing from the spirit and scope of the disclosure. For example, various forms of the flows shown above may be used, with steps re-ordered, added, or removed.

Functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. An electrical power management system, comprising:
one or more dual power units, each dual power unit comprising:
a first power unit that is operable to store and provide power to a load;
a second power unit that is operable to store and provide power to a load;
a first switch interposed between the first power unit and a power bus, the first switch operable to couple the first power unit to the power bus when in a closed state and operable to isolate the first power unit from the power bus when in an open state;
a second switch interposed between the second power unit and the power bus, the second switch operable to couple the second power unit to the power bus when in a closed state and operable to isolate the second power unit from the power bus when in an open state; and a bidirectional power conveyor connected to the first power unit and connected to the second power unit, and operable to convey power between the first power unit and the second power unit independent of respective voltages of the first power unit and the second power unit;

wherein, for each of the one or more dual power units:

the first switch and the second switch are bidirectional MOSFET switches, and each bidirectional MOSFET switch comprises a first MOSFET and a second MOSFET connected together by their respective sources, and wherein a respective drain of each first MOSFET is connected to a respective power unit, and a respective drain of each second MOSFET is connected to the power bus; and the controller is configured to provide control signals to the first switch and the second switch to cause the first switch and second switch to provide gate control signals to each bidirectional MOSFET switch during an initialization phase that causes each first MOSFET to be turned on and fully conducting and each second MOSFET to be turned off.

2. The electrical power management system of claim 1, wherein, for each of the one or more dual power units:

the first switch interposed between the first power unit and the power bus is connected to the first power unit at a first node;

the second switch interposed between the second power unit and the power bus is connected to the second power unit at a second node; and the bidirectional power conveyor is connected to the first power unit at the first node and connected to the second power unit at the second node, and further connected to the first power unit and the second power unit at a third node.

3. The electrical power management system of claim 2, wherein, in response to control signals provided to the first switch, the second switch, and the bidirectional power conveyor of a particular dual power unit, the dual power unit:

isolates the second power unit from the power bus by the second switch and cause the second power unit to convey power to the first power unit by the bidirectional power conveyor; and couples the first power unit to the power bus by the first switch to convey power to the load.

4. The electrical power management system of claim 3, wherein the bidirectional power conveyor of the particular dual power unit is configured by the control signals to operate in a boost mode to convey power from the second power unit to the first power unit when an output voltage of the first power unit is greater than an output voltage of the second power unit.

5. The electrical power management system of claim 3, wherein the bidirectional power conveyor of the particular dual power unit is configured by the control signals to operate in a buck mode to convey power from the second power unit to the first power unit when an output voltage of the first power unit is less than an output voltage of the second power unit.

6. The electrical power management system of claim 3, wherein in response to control signals provided to the first switch, the second switch, and the bidirectional power conveyor of the particular dual power unit, the particular dual power unit:

isolates the second power unit from the power bus by the second switch; and couples the first power unit to the power bus by the first switch to convey power to the load and convey power the second power unit by the bidirectional power conveyor.

7. The electrical power management system of claim 6, wherein the bidirectional power conveyor of the particular dual power unit is configured by the control signals to operate in a buck mode to convey power from the first power unit to the second power unit when an output voltage of the first power unit is greater than an output voltage of the second power unit.

8. The electrical power management system of claim 3, wherein in response to control signals provided to the first switch, the second switch, and the bidirectional power conveyor of the particular dual power unit:

the first power unit is connected to the power bus by the first switch and receives power from the power bus;

the second power unit is isolated from the power bus by the second switch; and the bidirectional power conveyor is configured by the control signals to convey power from the first power unit to the second power unit.

9. The electrical power management system of claim 8, wherein the bidirectional power conveyor of the particular dual power unit is configured by the control signals to operate in a buck mode to convey power from the first power unit to the second power unit when an output voltage of the first power unit is greater than an output voltage of the second power unit.

10. The electrical power management system of claim 3, wherein each of the one or more dual powers unit includes a controller, and the control signals for the particular dual power unit are generated by the controller of the dual power unit.

11. The electrical power management system of claim 3, each of the one or more dual power units receive the control signal from a control system that is external to each of the one or more dual power units.

12. The electrical power management system of claim 3, wherein the control signals provided to the bidirectional power conveyor cause the bidirectional power conveyor to operation the bidirectional power conveyor in borderline current mode (BCM).

13. The electrical power management system of claim 1, wherein each of the first power unit and the second power unit are selected from the group consisting of: a lithium-ion battery, a lead battery, a fuel cell, or a solar cell.

14. The electrical power management system of claim 1, wherein the first switch and/or the second switch is one of a unidirectional switch, a bidirectional switch, a diode, or a MOSFET.

15. The electrical power management system of claim 1, wherein the bidirectional power conveyor is selected from the group consisting of: a Buck-Boost converter, a dual-active bridge, and a resonant converter.

16. The electrical power management system of claim 1, wherein the bidirectional power conveyor comprises interleaved bidirectional power conveyor comprising a plurality of interleaved bidirectional power conveyor that each operate at respectively different phases from each other.

17. An electrical power management system, comprising:
a plurality of dual power units, each dual power unit comprising:
- a first power unit that is operable to store and provide power to a load;
- a second power unit that is operable to store and provide power to a load;
- a first switch interposed between the first power unit and a power bus, the first switch operable to couple the first power unit to the power bus when in a closed state and operable to isolate the first power unit from the power bus when in an open state;
- a second switch interposed between the second power unit and the power bus, the second switch operable to couple the second power unit to the power bus when in a closed state and operable to isolate the second power unit from the power bus when in an open state; and
- a bidirectional power conveyor connected to the first power unit and connected to the second power unit, and operable to convey power between the first power unit and the second power unit independent of respective voltages of the first power unit and the second power unit;

a control system that monitors voltages and currents within the electrical power management system in response generates and provides control signals to each of the plurality of dual power units, wherein:
the control system determines that a first power unit in a first dual power unit and a first power unit in a second dual power unit have respective output voltages that are within a threshold connection level of each other, and in response generates control signals that cause:
the first power unit of the first dual power unit to connect to the power bus, and the second power unit of the first dual power unit to isolate from the power bus; and
the first power unit of the second dual power unit to connect to the power bus, and the second power unit of the second dual power unit to isolate from the power bus.

18. The electrical power management system of claim 17, wherein the control signals cause:
the bidirectional power conveyor of the first dual power unit to convey power between the first power unit and the second power unit of the first dual power unit; and
the bidirectional power conveyor of the second dual power unit to convey power between the first power unit and the second power unit of the second dual power unit;
thereby conveying power between the first power unit and the second power unit of the first dual power unit and the first power unit and the second power unit of the second dual power unit.

19. A method of electrical power management, comprising operations of:
in at least one of one or more dual power units:
operatively coupling and decoupling a first power unit and a second power unit to a power bus that provides power to a load, where each of the first power unit and the second power unit are operable to store and provide power to the load; and
bidirectionally conveying power between the first power unit and the second power unit depending on a mode of electrical power management, comprising:
in a first mode, coupling the first power unit to the power bus to convey power from the first power unit to the load, isolating the second power unit from the power bus, and conveying, by a bidirectional power conveyor, power from the second power unit to the first power unit;
wherein operatively coupling and decoupling the first power unit and the second power unit to a power bus is done by operatively controlling bidirectional MOSFET switches that are respectively connected to the first power unit and the second power unit, and each bidirectional MOSFET switch comprises a first MOSFET and a second MOSFET connected together by their respective sources, and wherein a respective drain of each first MOSFET is connected to a respective power unit, and a respective drain of each second MOSFET is connected to the power bus, and the operations comprise:
providing gate control signals to each bidirectional MOSFET switch during an initialization phase that causes each first MOSFET to be turned on and fully conducting and each second MOSFET to be turned off.

20. The method of claim 19, the operations further comprising:
in the first mode, operating the bidirectional power conveyor in a boost mode when an output voltage of the second power unit is less than an output voltage of the first power unit; and
in the first mode, operating the bidirectional power conveyor in a buck mode when an output voltage of the second power unit is greater than an output voltage of the first power unit.

21. The method of claim 20, wherein bidirectionally conveying power further comprises the operations of:
in a second mode, coupling the first power unit to the power bus to receive power from the load, isolating the second power unit from the power bus, and conveying, by the bidirectional power conveyor, power from the first power unit to the second power unit.

22. The method of claim 21, the operations further comprising:
in the second mode, operating the bidirectional power conveyor in a boost mode when an output voltage of the first power unit is less than an output voltage of the second power unit; and
in the second mode, operating the bidirectional power conveyor in a buck mode when an output voltage of the first power unit is greater than an output voltage of the second power unit.

23. The method of claim 19, wherein bidirectionally conveying power between the first power unit and the second power unit depending on a mode of electrical power management comprises operating the bidirectional power conveyor in borderline current mode (BCM).

24. An electrical power management system, comprising:
one or more dual power units, each dual power unit comprising:
- a first power unit that is operable to store and provide power to a load;
- a second power unit that is operable to store and provide power to a load;
- a first switch interposed between the first power unit and a power bus, the first switch having a first end connected to the power bus and a second end connected to the first power unit at a first node, the first switch operable to couple the first power unit to the power bus when in a closed state and operable to isolate the first power unit from the power bus when in an open state;

a second switch interposed between the second power unit and the power bus, the second switch having a first end connected to the power bus and a second end connected to the second power unit at a second node that is separate from the first node, the second switch operable to couple the second power unit to the power bus when in a closed state and operable to isolate the second power unit from the power bus when in an open state; and a bidirectional power conveyor having a first connection point connected to the first power unit at the first node, and a having a second connection point separate from the first connection point and connected to the second power unit at the second node, and operable to convey power between the first power unit and the second power unit independent of respective voltages of the first power unit and the second power unit.

25. The electrical power management system of claim 24, wherein, for each of the one or more dual power units, the bidirectional power conveyor is further connected to the first power unit and the second power unit at a third node that is separate from the first node and the second node.

26. The electrical power management system of claim 25, wherein, in response to control signals provided to the first switch, the second switch, and the bidirectional power conveyor of a particular dual power unit, the dual power unit:

in a first operational mode:
isolates the second power unit from the power bus by the second switch and causes the second power unit to convey power to the first power unit by the bidirectional power conveyor; and
couples the first power unit to the power bus by the first switch to convey power to the load; and in a second operational mode different from the first operational mode:
isolates the first power unit from the power bus by the first switch and causes the first power unit to convey power to the second power unit by the bidirectional power conveyor; and
couples the second power unit to the power bus by the second switch to convey power to the load.

27. The electrical power management system of claim 26, wherein:

the bidirectional power conveyor of the particular dual power unit is configured by the control signals to operate in a boost mode to convey power from the second power unit to the first power unit when an output voltage of the first power unit is greater than an output voltage of the second power unit; and the bidirectional power conveyor of the particular dual power unit is configured by the control signals to operate in a buck mode to convey power from the second power unit to the first power unit when an output voltage of the first power unit is less than an output voltage of the second power unit.

28. The electrical power management system of claim 25, wherein the control signals provided to the bidirectional power conveyor cause the bidirectional power conveyor to operation the bidirectional power conveyor in borderline current mode (BCM).

* * * * *

UNITED STATES PATENT AND TRADEMARK OFFICE
CERTIFICATE OF CORRECTION

PATENT NO. : 11,644,886 B1
APPLICATION NO. : 17/746643
DATED : May 9, 2023
INVENTOR(S) : Shmuel Ben-Yaacov, Paul Abraham Price and Oded Arlevski Page 1 of 1

It is certified that error appears in the above-identified patent and that said Letters Patent is hereby corrected as shown below:

In the Claims

Column 19, Line 12, in Claim 24: delete "a having" and insert --having--, therefor.

Column 20, Line 26 (approx.), in Claim 28: delete "claim 25" and insert --claim 24--, therefor.

Signed and Sealed this
Eighteenth Day of July, 2023

*Katherine Kelly Vidal*

Katherine Kelly Vidal
*Director of the United States Patent and Trademark Office*